April 9, 1968     P. A. LEMPKA     3,376,630
METHOD OF BORING AWAY BEARING MATERIAL INTEGRAL WITH
A FRAME CONTAINING A JOURNAL
Filed May 5, 1966

INVENTOR
PAUL A. LEMPKA
BY *Marvin B. Davis*
ATTORNEY

United States Patent Office 3,376,630
Patented Apr. 9, 1968

3,376,630
METHOD OF BORING AWAY BEARING MATERIAL INTEGRAL WITH A FRAME CONTAINING A JOURNAL
Paul A. Lempka, 8519 Sleepy Hollow, Kansas City, Mo. 64114
Filed May 5, 1966, Ser. No. 547,986
1 Claim. (Cl. 29—401)

ABSTRACT OF THE DISCLOSURE

The bearing material is concentrically bored away by a drill-reamer engaging the journal of a gear shaft while the gear thereof is meshed with other gears.

---

This invention relates to a method of boring away bearing material integral with a frame containing a journal of a shaft and bushing the journal in the bore of the frame.

An object of this method is to replace a worn bearing, integral with the frame containing a gear train, with a bushing to accurately and concentrically register with the original bearing of a journal of the gear train. This method is especially adapted for jewelers.

This method may be applied to clocks, meters, timing devices, and any frame having integral bearings therewith for the journals of a gear train.

The method is to select a drill-reamer having a longitudinal bearing aligned in the longitudinal and concentric center thereof with an opening on the reaming end thereof to fit a journal of a bearing to be replaced; place the mentioned opening of the drill-reamer on the end of the mentioned journal of the shaft mounted in a journal bearing integral with a frame; revolve and advance the drill-reamer toward the shoulder of the shaft to gradually bore and ream away the old bearing material in the mentioned frame, of the gears and shafts, to a major depth of the bearing; withdraw the reamer from the bore in the mentioned frame: select an end-reamer having a concave cutting end, and a longitudinal hollow, opening on the cutting end of the end-reamer, of sufficient size to receive the end portion of the shaft of the mentioned journal; revolve and advance the end-reamer into the bore of the mentioned frame, cutting around the remaining end piece of the original bearing material to avoid damage to the shoulder of the shaft of the mentioned journal; withdraw the end-reamer from the bore in the frame; remove the remaining end material of the original bearing; select a bushing to accurately fit the mentioned journal and reamed hole; advance the bushing into the reamed hole and onto the mentioned journal to abut the shoulder of the mentioned shaft; and use a means for securing the mentioned bushing in the bore and reamed hole of the frame.

This specification will be more fully understood with reference to the accompanying drawing.

In the drawing:

FIGURE 1 is a view illustrating the drill-reamer, with a portion thereof cut away to show the longitudinal journal bearing herein. The bearing is concentrically located therein with an opening on the drilling and reaming end thereof. A set collar is shown on the shank of the drill-reamer to limit the depth of boring and reaming into the frame of a gear train. A portion of the collar is broken away to show the set screw. An arrow shows the usual direction of rotation.

FIGURE 2 is a view illustrating an elevation of FIGURE 1, and shows the cutting and reaming edges on the end thereof. Grooves are shown in the shank to register with the cutting edges to collect the cuttings from the bore in the frame of a gear train. An arrow shows the usual direction of rotation of the cutting edges.

Figures 1, 2:
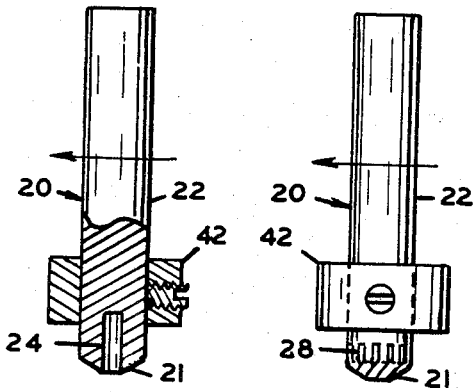
Figures 3, 4:
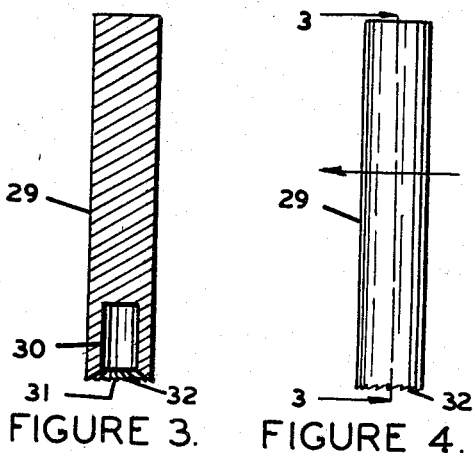
FIGURE 3 is a view illustrating a section taken on lines 3—3 of FIGURE 4, showing the concave cutting end thereof, and the hollow concentric bore of sufficient size to clear the shoulder of a shaft and journal.
FIGURE 4 is a view illustrating an elevation of the end-reamer. An arrow shows the usual direction of rotation of the cutting edges.
Figure 5:
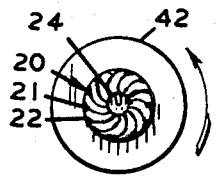
FIGURE 5 is a view illustrating the cutting end of the drill-reamer.
Figure 6:
FIGURE 6 is a view illustrating the cutting end of the end-reamer. The cutting edges feed the cuttings into the large bore of the end-reamer.
Figure 7:
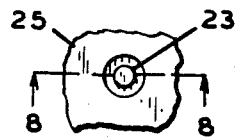
FIGURE 7 is a view illustrating a fragmentary view of the frame of the gear train, showing the end of one journal and the integral bearing material of the frame around the journal.
Figure 8:
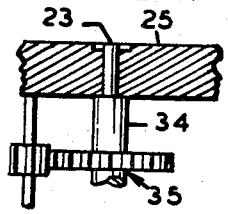

FIGURE 8 is a view illustrating a section taken on lines 8—8 of FIGURE 7 with the addition of another shaft having a gear or pinion meshed with a gear. One of the shafts is shown journaled in an integral bearing of a frame. The pair of gears shown are usually multiplied into a gear train.

Figure 9:
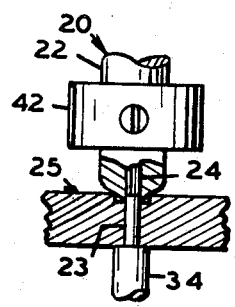

FIGURE 9 is a view illustrating a journal in a section of a frame with the drill-reamer located on the end of a journal preparatory to drilling and reaming the bearing material away from the frame.

Figure 10:
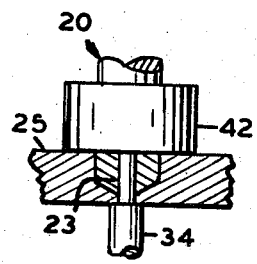

FIGURE 10 is a view similar to FIGURE 9 with the exception that the drill-reamer is advanced to the major depth of the plate of the frame and the set collar gauges the depth of the bore of the drill-reamer.

Figure 11:
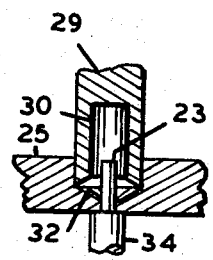

FIGURE 11 is a view similar to FIGURE 10 with the exception that the drill-reamer is removed and a concave end-reamer is positioned in the bore to cut away the remaining frame bearing material above the shoulder of the shaft.

Figure 12:
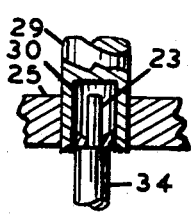

FIGURE 12 is a view illustrating the completion of the cutting of the end-reamer started in FIGURE 11. The remaining end material of the frame bore is now located in the hollow portion of the end-reamer.

Figure 13:
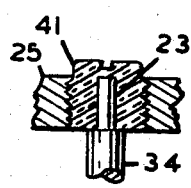

FIGURE 13 is a view in section illustrating a jewel type bearing that may be threaded into the bore of the frame.

Figures 14, 15:
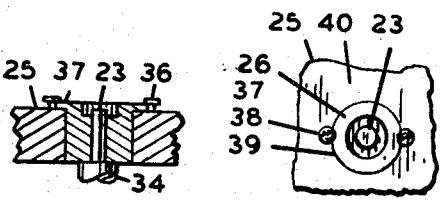

FIGURE 14 is a view in section illustrating a bushing located in the frame bore that may be flanged and secured with a means of screws.

FIGURE 15 is a view of a regular type bushing illustrating a plan of securing it in the bore with a means of screws in the frame and flanged over the edge of the bushing.

Figures 16, 17:
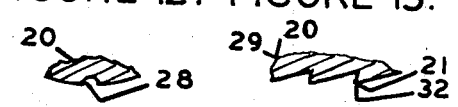

FIGURE 16 is a view illustrating a fragment in section of the drill-reamer, greatly enlarged to show one of the grooves in the shank of the drill-reamer for collecting the boring material.

FIGURE 17 is a view illustrating a fragment in section of the cutting edge of either the drill-reamer or the end-reamer. The view is greatly enlarged for illustration.

All views of the accompanying drawing are greatly enlarged for illustrative purposes, and it is necessary for one to visualize the views and parts reduced for jeweler's work.

It is obvious that special tools have been prepared and illustrated for the practice of this method, and they are believed to be a part of my invention for the practice of my method.

The drill-reamer 20 illustrated in FIGURES 1, 2, 6, 9 and 10 has a plurality of cutting edges 21 on one end of the shank 22. The end of the shank 22 containing the cutting edges 21, preferably may be of frustrum shape as illustrated, or may be of a hemispherical shape (not shown). Either shape will tend to hold the drill-reamer 20 concentric on the journal 23, with the internal bearing 24 of the drill-reamer 20, controlling the concentric position for the boring or drilling and reaming into the frame 23 for a bushing 26.

The journal bearing 24 located internally and concentric with a section of the drill-reamer shank 22 has a depth therein greater than the length of any journal 23 in a frame 25.

A number of drill-reamers 20 are required for the different size journals usually found in the frames of gear trains.

The cutting edges 21 of a drill-reamer 20 are curved or angled rearwardly from the radii of the shank 22 in the direction of rotation to feed the cuttings from the bore 27 into the grooves 28 to prevent scoring the surface of the bore 27.

The end reamer 29 is provided with a longitudinal bore 30 opening on the concave cutting end 31 of the end reamer 29.

The outside diameter of most of the drill-reamers 20 are preferred to equal the outside diameter of an end-reamer 29, and the internal bore 30 of the end-reamer 29 is of sufficient diameter to receive most of the end portions of shafts 34 of journals 23, so that one end-reamer 29 may be sufficient for a number of drill-reamers 20.

The cutting edges 32 of the end-reamer 29 are angled forwardly from the direction of turning, with reference to the radii of a shank section, to feed the cuttings of bearing material (not shown) into the bore 27. The bore 27 is of sufficient diameter to clear the shoulder 33 of any shaft 34 of a gear train 35 in a frame 25.

The bushings 26 may be secured by any means; of press-fit, screws 36 on flanges 37, or screws 38 flanging on the flush edge 39 of a bushing 26 with the frame surface 40. A jewel bushing 41 may be threaded into the bore 27 of the frame 25.

A set-collar 42 is located on the shank 22 of the drill-reamer 20 to gauge the depth of the bore in a frame 25.

To practice my method I select a drill-reamer having a longitudinal journal bearing aligned in the longitudinal and concentric center thereof with an opening on the reaming end thereof to fit a journal of a bearing to be replaced; place the mentioned opening of the drill-reamer on the end of the mentioned journal of a shaft while the shaft is in the original bearing and connected with a gear train; revolve and advance the drill-reamer to gradually bore away the old bearing material in the frame of the gear train to a major depth of the bearing; withdraw the drill-reamer from the mentioned frame; select an end-reamer having a longitudinal hollow and a concave end, revolve and advance the end-reamer in the bore of the mentioned frame, cutting around the remaining end piece of the original bearing material to avoid damage to the shoulder of the shaft of the mentioned journal; remove the remaining material by means of gravity or instruments; select a bushing to accurately fit the mentioned journal and reamed hole; advance the bushing into the reamed hole and on the mentioned journal to abut the shoulder on the mentioned shaft; and securing the mentioned bushing in the frame of the gear train.

I claim:

1. A method of drilling and reaming away the bearing material integral with a frame supporting a journal shaft; for the replacement thereof with a bushing; while the shaft having a gear meshed with another gear is mounted in the mentioned frame; the method steps follow:

(a) select a drill-reamer having a longitudinal journal bearing aligned in the longitudinal and concentric center thereof with an opening on the reaming end thereof to fit a journal of a bearing to be replaced, (b) place the mentioned opening of the drill-reamer on the end of the mentioned journal of the shaft mounted in a journal bearing integral with a frame, (c) revolving and advancing the drill-reamer toward the shoulder of the shaft to gradually bore away the old bearing material in the mentioned frame of the gears and shafts to a major depth of the bearing, (d) withdraw the reamer from the bore in the mentioned frame, (e) select an end-reamer having a concave cutting end and a longitudinal hollow opening on the cutting end of the end-reamer of sufficient size to receive the end portion of the shaft of the mentioned journal, (f) revolve and advance the end-reamer into the bore of the mentioned frame, cutting around the remaining end piece of the original bearing material to avoid damage to the shoulder of the shaft of the mentioned journal, (g) withdraw the end-reamer from the bore in the frame, (h) remove the remaining end material of the original bearing, (i) select a bushing to accurately fit the mentioned journal and reamed hole, (j) advance the bushing into the reamed hole and onto the mentioned journal to abut the shoulder of the mentioned shaft, (k) and use a means for securing the mentioned bushing in the bore and reamed hole of the frame.

References Cited
UNITED STATES PATENTS

| | | | |
|---|---|---|---|
| 1,860,605 | 5/1932 | Baldwin | 29—406 |
| 1,992,815 | 2/1935 | Craney | 29—401 |
| 2,483,765 | 10/1949 | Hamel | 29—177 X |
| 2,594,810 | 4/1952 | Schaub et al. | 29—149.5 X |

THOMAS H. EAGER, *Primary Examiner.*